(12) United States Patent
Dobbin (10) Patent No.: US 10,308,373 B2
(45) Date of Patent: Jun. 4, 2019

(54) LOBED NUT CAP

(71) Applicant: AIRBUS OPERATIONS LIMITED, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 203 days.

(21) Appl. No.: 15/118,845

(22) PCT Filed: Feb. 6, 2015

(86) PCT No.: PCT/GB2015/050330
§ 371 (c)(1),
(2) Date: Aug. 12, 2016

(87) PCT Pub. No.: WO2015/121624
PCT Pub. Date: Aug. 20, 2015

(65) Prior Publication Data
US 2017/0050746 A1 Feb. 23, 2017

(30) Foreign Application Priority Data
Feb. 13, 2014 (GB) .................................. 1402491.3

(51) Int. Cl.
*F16B 37/14* (2006.01)
*B64D 45/02* (2006.01)
*B64D 37/32* (2006.01)

(52) U.S. Cl.
CPC ............. *B64D 45/02* (2013.01); *B64D 37/32* (2013.01); *F16B 37/14* (2013.01)

(58) Field of Classification Search
CPC ............................... F16B 37/14; F16L 57/005
(Continued)

(56) References Cited

U.S. PATENT DOCUMENTS 1,783,892 A * 12/1930 Unke ...................... B65D 59/06
                                                    138/96 T
3,145,751 A *  8/1964 Boots ...................... F16B 37/14
                                                    411/282
(Continued)

FOREIGN PATENT DOCUMENTS

AU          534714 B3      2/1984
DE       10148414 C1      3/2003
(Continued)

OTHER PUBLICATIONS

UKIPO Search Report dated May 11, 2014 for Great Britain Application No. 1402491.3.
(Continued)

*Primary Examiner* — Flemming Saether
(74) *Attorney, Agent, or Firm* — Nixon & Vanderhye P.C.

(57) ABSTRACT

The present invention proposes a cap having a collar portion with three or more contact regions arranged to contact the end of a fastener around which the collar portion is provided, the collar portion having a lobed shape in cross-section such that an outwardly projecting lobe extends between each neighboring pair of contact regions. An advantage of this lobed arrangement is that the cap can tolerate relatively large manufacturing tolerances at the fastener end. For example, the cap may be for fitting over a nut or fastener head, with the contact regions of the cap being arranged to contact corresponding contact regions on a cylindrical collar base portion of the nut or fastener head. The diameter of this cylindrical collar portion may not be well controlled, so that the manufacturing tolerance is high. The lobed shape of the cap base ensures that the contact regions will always provide a good frictional engagement with the nut, whether the cylindrical collar is undersized, oversized, or at its nominal diameter.

13 Claims, 7 Drawing Sheets (58) Field of Classification Search
USPC ............... 411/431, 377, 373, 375.2; 52/301; 138/96 T
See application file for complete search history.

(56) References Cited

U.S. PATENT DOCUMENTS

| | | | | |
|---|---|---|---|---|
| 3,548,704 | A * | 12/1970 | Kutryk | .................... F16B 37/14 411/373 |
| 3,840,052 | A * | 10/1974 | Schmidt | ................. B65D 59/08 138/96 T |
| 3,897,712 | A | 8/1975 | Black | |
| 3,960,047 | A * | 6/1976 | Liffick | ..................... B60B 3/16 411/429 |
| 4,033,380 | A * | 7/1977 | Weber | .................... B65D 59/06 138/96 T |
| 4,905,931 | A | 3/1990 | Covey | |
| 5,017,068 | A * | 5/1991 | Cooksey | ............. F16B 23/0061 403/282 |
| 6,305,627 | B1 * | 10/2001 | Stiner | ................. A01K 89/006 242/283 |
| 7,172,380 | B2 * | 2/2007 | Lees | ....................... F16B 37/14 411/120 |
| 8,388,293 | B2 * | 3/2013 | Hutter, III | ............... F16B 37/14 411/377 |
| 9,228,604 | B2 * | 1/2016 | Dobbin | .................. B64D 45/02 |
| 9,599,141 | B2 * | 3/2017 | Dobbin | .................. B64D 45/02 |
| 9,631,666 | B1 * | 4/2017 | Colford | ................... F16B 33/00 |
| 9,764,854 | B2 * | 9/2017 | Dobbin | .................. B64D 45/02 |
| 2012/0219380 | A1 | 8/2012 | Hutter, III | |
| 2013/0322982 | A1 | 12/2013 | Dobbin | |
| 2014/0048198 | A1 | 2/2014 | Dobbin et al. | |
| 2015/0184688 | A1 | 7/2015 | Dobbin et al. | |
| 2015/0300397 | A1 | 10/2015 | Dobbin | |
| 2016/0076574 | A1 | 3/2016 | Dobbin | |

FOREIGN PATENT DOCUMENTS

| | | |
|---|---|---|
| EP | 0334011 A1 | 9/1989 |
| EP | 2698318 A2 | 2/2014 |
| GB | 1157527 A | 7/1969 |
| JP | S643308 A | 1/1989 |
| JP | 3021104 U | 2/1996 |
| WO | 2012107741 A1 | 8/2012 |
| WO | 2013178985 A1 | 12/2013 |
| WO | 2014072687 A2 | 5/2014 |

OTHER PUBLICATIONS

ISR and Written Opinion dated May 28, 2015 for International Application No. PCT/GB2015/050330.

\* cited by examiner

FIG. 1

PRIOR ART

LOBED NUT CAP

RELATED APPLICATIONS

The present application is a National Phase of International Application Number PCT/GB2015/050330 filed Feb. 6, 2015 and claims priority to Great Britain Application Number 1402491.3 filed Feb. 13, 2014.

FIELD OF THE INVENTION

The present invention relates to a cap and a kit of parts for forming a sealed cavity around one end of a fastener, a method of installing such a cap, and a joint comprising such a cap.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightening attachment at any of the many metallic fasteners in the exterior surface, which have a much lower electrical resistance. In the wing, some of these fasteners pass through the outer wing skin into the fuel tank.

Figure 1:
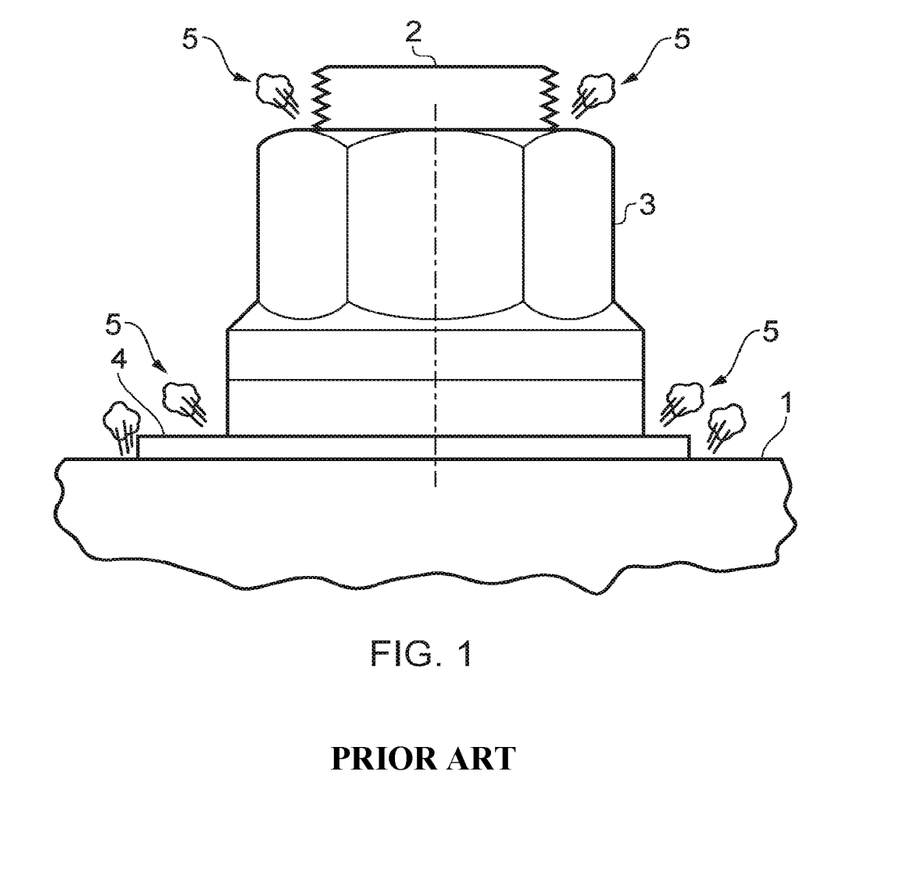
FIG. 1 shows a side view of part of a prior art fastener assembly passing through a panel.

FIG. 1 is a side view of part of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1. The panel 1 may provide a fuel tank boundary and the fastener may therefore be immersed in fuel or fuel vapour rich gas. A lightning strike at the fastener may thus provide sparking and hot gas ignition sources which could cause ignition of the fuel.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

The present invention proposes a cap having a collar portion with three or more contact regions arranged to contact the end of a fastener around which the collar portion is provided, the collar portion having a lobed shape in cross-section such that an outwardly projecting lobe extends between each neighbouring pair of contact regions.

A first aspect of the invention provides a cap for forming a sealed cavity around an end of a fastener, the cap comprising a cap body having a collar portion terminating at a rim which surrounds an opening for receiving the end of the fastener, the collar portion having three or more discrete contact regions distributed around an internal face thereof, each contact region being arranged to contact the end of the fastener when the collar portion is installed on the end of the fastener, wherein the collar portion has a lobed shape such that a radially outwardly bulging lobe extends between each neighbouring pair of contact regions.

An advantage of this lobed arrangement is that the cap can tolerate relatively large manufacturing tolerances at the fastener end. For example, the cap may be for fitting over a nut or fastener head, with the contact regions of the cap being arranged to contact corresponding contact regions on a base portion of the nut or fastener head. The diameter of this base portion may not be well controlled, so that the manufacturing tolerance is high. The lobed shape of the collar portion of the cap body ensures that the contact regions will always provide a good frictional engagement with the nut or fastener head, whether its base portion is undersized, oversized, or at its nominal size. When the nut or fastener head base portion is manufactured to its nominal size the collar portion of the cap body will distort on assembly so that it its cross-sectional shape substantially corresponds to the cross-sectional shape of the base portion of the nut or fastener head. However, when the base portion is undersized the collar portion of the cap body will remain generally lobe shaped after assembly but with the lobes becoming shallower, while when it is oversized the collar portion will distort so that it has an inverted lobed shape, with the lobes corresponding to the contact regions rather than being formed between them.

The invention applies to caps with contact regions arranged to contact corresponding contact regions on a portion of a fastener end which has either a circular cross-sectional shape or a non-circular cross-sectional shape, e.g. a hexagonal cross-sectional shape.

The lobed shape of the first aspect may also be advantageous in applications in which there are only small manufacturing tolerances at the fastener end. In such applications the collar portion will generally always distort on assembly so that its cross-sectional shape substantially corresponds to the cross-sectional shape of the fastener end. This may be particularly advantageous in applications in which the cap base is assembled with an outer cap member or a plunger member which has a correspondingly shaped annular base portion arranged to fit around or within the cap base, since it may be desirable to maintain a generally even gap between the two parts.

The cap body preferably comprises a material which is sufficiently flexible, or deformable, to accommodate a change in shape of the collar portion from the lobed shape to a substantially annular shape. Suitable materials include (glass) fibre reinforced polymers, preferably thermoplastic polymers such as polyetherimide (PEI) or polyether ether ketone (PEEK).

A second aspect of the invention provides a joint comprising: a structure; a fastener passing through the structure so that an end thereof protrudes from the structure; and a cap according to the first aspect providing a sealed cavity around the end of the fastener, wherein a sealant material provides a seal between the collar portion of the cap and the structure.

A suitable sealant material may comprise a polysulphide sealant or a two-part epoxy based structural adhesive.

A third aspect of the invention provides an aircraft assembly comprising a joint according to the second aspect.

A fourth aspect of the invention provides a method of forming a sealed cavity around an end of a fastener protruding from a structure, the method comprising:
providing a cap having a cap body terminating at a rim which surrounds an opening for receiving the end of the fastener, the cap body having three or more contact regions distributed around an internal face of the cap body, wherein the cap body has a lobed shape in cross-section such that a radially outwardly bulging lobe extends between each neighbouring pair of contact regions;

installing the collar portion on the end of the fastener so that the contact regions each contact the end of the fastener and are forced radially outwardly so that the collar portion has a cross-sectional shape substantially corresponding to a cross-sectional shape of the end of the fastener.

Preferably, the cross-sectional shape of the end of the fastener is substantially circular.

A fifth aspect of the invention provides a kit of parts for forming a sealed cavity around an end of a fastener, including a fastener having an end with three or more contact regions distributed around the fastener end; and a cap having a cap body terminating at a rim which surrounds an opening for receiving the end of the fastener, the cap body having three or more contact regions distributed around the cap body, each contact region of the cap body corresponding to a contact region of the fastener end, and the cap body having a lobed shape such that a radially outwardly bulging lobe extends between each neighbouring pair of contact regions, wherein the contact regions of the fastener are located radially further outwardly than the contact regions of the collar portion.

Various optional, or preferred, features of the invention are described below.

Each of the contact regions may comprise a ridge projecting inwardly from the internal face of the collar portion. Each ridge may have an elongate shape such that its longitudinal direction corresponds to the axial direction of the collar portion. Such ridges provide a gap between the collar portion and a fastener end, and also help to ensure accurate co-axial location of the cap on the fastener end.

In a first variation of the various aspects of the invention, the cap body may have an end wall opposite the collar portion opening to form an enclosure. Thus, the cap body itself can provide a sealed cavity around the fastener end.

In embodiments of the first variation, the cap may have an annular flange which extends radially outwardly from the collar portion at an intersection which is set back from the rim so as to define an annular sealing cavity between the flange and the collar portion. Thus, the annular sealing cavity may be filled with sealing material to provide a seal between the cap and the structure from which the fastener end protrudes, to thereby provide a sealed cavity around the fastener end. The sealing material may be applied directly into the annular sealing cavity before installation of the cap, or alternatively the annular flange may include a sealing material inlet in fluid communication with the annular sealing cavity to permit injection of sealing material into the annular sealing cavity after installation of the cap.

In a second variation, the cap may have an outer cap member arranged to be installed over the cap body so as to enclose the cap body, the outer cap member having an annular collar portion and an annular flange which extends radially outwardly away from the annular collar portion, the annular flange and annular collar portion between them defining an annular sealing cavity for receiving sealing material. In such an embodiment the outer cap member provides the sealed cavity around the fastener end.

The cap body and outer cap member may be pre-assembled together before installation on the fastener end. Sealing material may be provided in the annular sealing cavity prior to installation, or may be injected into the annular sealing cavity after installation via a sealing material inlet in the annular flange.

Alternatively, the cap body may be installed on the fastener end and the outer cap member then assembled with the cap body. In such an arrangement the sealing material may be provided in the outer cap member prior to assembly with the cap body, so that the sealing member is caused to flow into the annular sealing member during assembly. The sealing material may alternatively be provided in the annular sealing cavity prior to assembly, the act of assembly causing the sealing material to come into contact with the structure from which the fastener end protrudes.

In preferred embodiments of the second variation, the annular base of the outer cap member terminates at a rim, and the annular flange extends from the outer cap member at an intersection which is set back from the rim. This arrangement facilitates pre-filling of the annular sealing volume with sealing material prior to installation of the outer cap member on the cap body.

In a third variation, the cap may include a plunger terminating at a plunger rim which surrounds a plunger opening, and an annular flange extending radially outwardly away from the plunger so as to define an annular sealing cavity, the plunger being fitted over the collar portion and being slidably movable in an axial direction relative to the collar portion, and the plunger or the collar portion comprising an end wall opposite the plunger opening or the collar portion opening, respectively, to form an enclosure.

In such an embodiment the cap body may first be installed on the fastener end, and the plunger then assembled with to the cap body e.g. by sliding relative to the cap body. The annular sealing cavity may be filled with sealing material prior to assembly of the plunger with to the cap body, such that the process of assembly the outer cap member with the cap body includes bringing the sealing material within the annular sealing cavity into contact with the structure from which the fastener end protrudes. Thus, the fastener end may be enclosed in a sealed cavity formed by either the plunger or the cap body. An advantage of this arrangement is that the installation of the plunger on the cap body may act to further deform the cap body to further alter its cross-sectional shape. That is, the installation of the plunger may cause the cap body to assume a cross-sectional shape which more closely approaches the cross-sectional shape of the fastener end.

In embodiments of the first, second or third variations, the cap may further include a sealing material inlet in fluid communication with the annular sealing cavity, the sealing material inlet being arranged to interconnect with a sealing material injection device to provide a flow of curable sealing material from the sealing material inlet into the annular sealing cavity. Thus, the sealing material may be applied to the cap to effect the sealed cavity after the cap has been installed on the fastener end. The sealing material inlet may be provided in the annular flange, the cap body, the outer cap member, or the plunger.

In all embodiments of all aspects the collar portion of the cap body may include four or more contact regions, five or more contact regions, six or more contact regions, or seven or more contact regions, and corresponding numbers of lobes.

Any of the optional, desirable, or preferred features of the invention described herein may be applied to any of the aspects of the invention, either alone or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
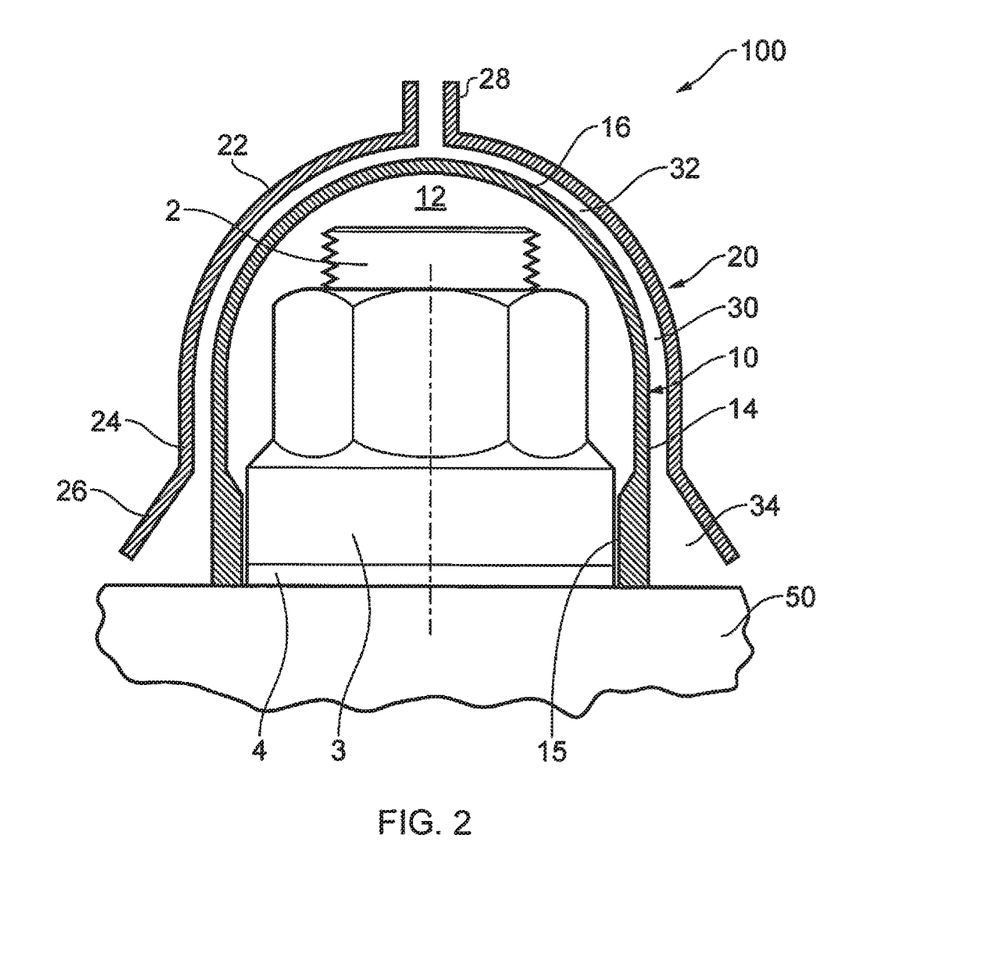
FIG. 2 shows a cross-sectional side view of an embodiment of a cap according to the present invention installed on a fastener assembly passing through a panel.
Figure 3:
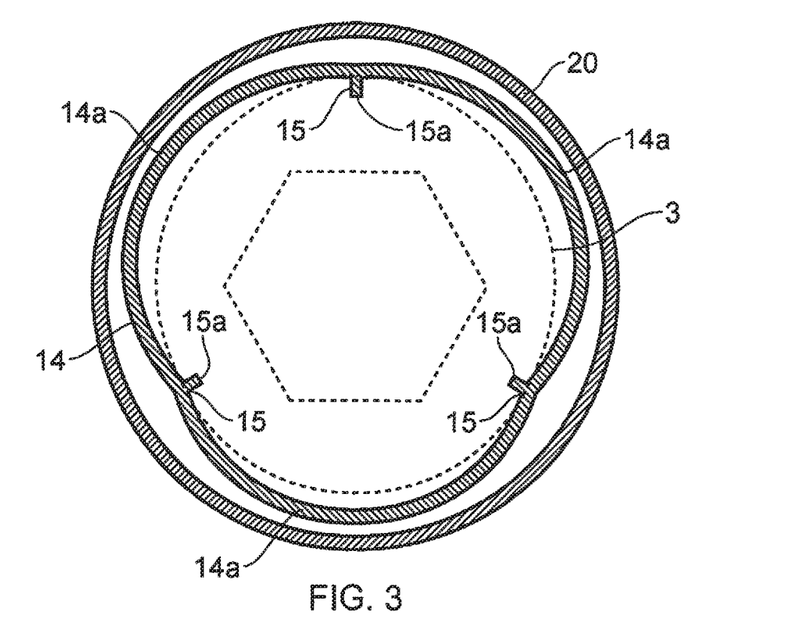
FIGS. 3 and 4 show cross-sectional plan views of the cap of FIG. 2 before (FIG. 3) and after (FIG. 4) installation on the fastener assembly.
Figure 4:
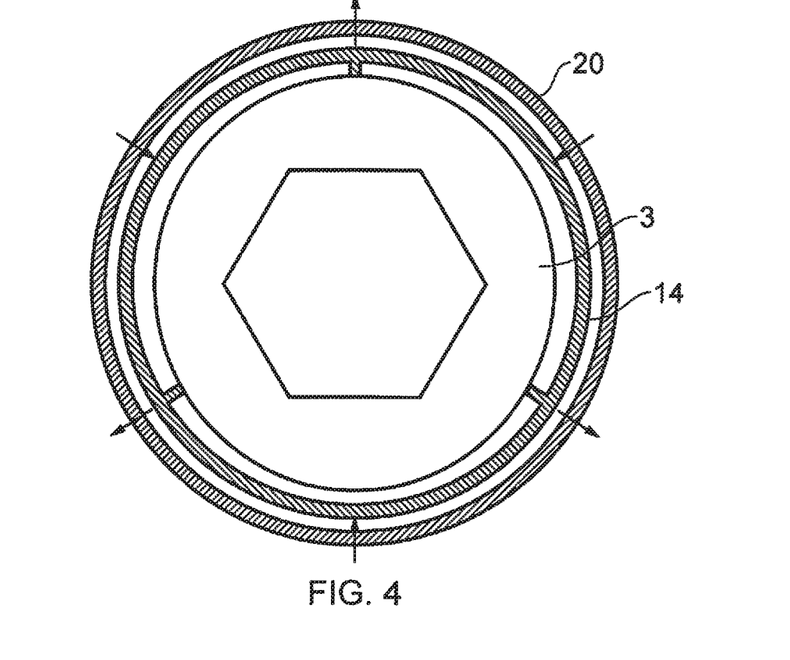

A first embodiment of an injectable nut cap 100 according to the present invention is illustrated in FIGS. 2 to 4. The injectable nut cap 100 includes an inner cap member 10 (which may also be referred to as a cap body or base) and an outer cap member 20. The inner and outer cap members 10, 20 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 10 is a generally thin-walled dome-shaped member, with a correspondingly dome-shaped inner air cavity 12 which encloses the tail end of a fastener 2, 3, 4 protruding from a structural element, which in this embodiment is a composite aircraft structural component 50, but may be a hybrid composite-metallic component. That is, the air cavity 12 encloses the part of a bolt 2 which protrudes from the structural element 50, and a nut 3 and washer 4 fastened to that bolt 2. The inner cap member 10 is generally made up of a base collar portion 14 joined to an upper dome portion 16. In use, the exposed rim 18 of the base collar portion 14 abuts the structural element 50 to fully encapsulate the tail end of the fastener 2, 3, 4 within the air cavity 12.

The outer cap member 20 is also a generally thin-walled dome shaped member, and is shaped to fit over the inner cap member 10 so that there is a continuous sealing volume 30 between them. The outer cap member 20 is generally made up of a central dome portion 22 and a mid cylindrical portion 24 which connects the dome portion 23 to an annular flared skirt portion 26, which may have a raised lip (not shown) at its free edge. The outer cap member 20 has a cylindrical central inlet opening 28 in its central dome portion 22 which is sized to interconnect with the nozzle of a sealing material injector gun (not shown). The nozzle delivers a continuous flow of sealing material (not shown) into the sealing volume 30 via the opening 28. In the present embodiment a two-part epoxy based structural adhesive such as Scotch-Weld™ 7256 B/A, produced by 3M™, is preferred. This adhesive is supplied in cartridge form (50 ml cartridges being preferred) and mixed within the nozzle on application by the injector gun. Such epoxy based adhesives are free-flowing, have a low viscosity, and exhibit rapid cure at room temperature. A suitable alternative material is a two-part polysulphide based sealant such as MC-238 Class A/B, produced by Naftoseal™.

As shown in FIG. 3, the base collar portion 14 of the inner cap member 10 has a tri-lobed shape in cross-section prior to assembly onto the fastener end 2, 3, 4 (the size of the lobes is exaggerated in FIG. 3 to aid understanding). In preferred arrangements the tri-lobed cross-sectional shape extends from the lower rim of the inner cap member 10 to a location substantially in line with (or in the vicinity of) the junction between the mid cylindrical portion 24 and annular flared skirt portion 26 of the outer cap member 20. The cross-sectional shape of the inner cap member between this location and the upper dome portion 16 changes to provide a continuous blending from the tri-lobed shape to a substantially circular shape. The inner cap member 10 has three elongate ridges 15 which extend longitudinally in the axial direction of the cap 100 and project radially inwardly from three evenly spaced positions around the base collar portion 14. The ridges 15 each provide a contact region 15a at which the inner cap member 10 can contact the fastener, and the tri-lobed shape is such that a radially outwardly extending lobe 14a extends between each neighbouring pair of ridges 15. Although there are three contact regions 15a, and three lobes 14a, in this embodiment, the invention extends to embodiments with more than three contact regions and lobes, and especially to embodiments with four, five, six or seven contact regions and lobes.

The lobed shape of the inner cap member 10 enables the base collar portion 14 to deform so that it has a substantially cylindrical shape as a result of its installation on the fastener end, as shown in FIG. 4. The inner cap member 10 is installed on the fastener end so that the contact regions 15a of the ridges 15 each contact a corresponding contact region around the cylindrical collar part of the nut 3 of the fastener. Prior to installation (FIG. 3), the contact regions of the nut 3 are located radially further outwardly than the contact regions 15a of the inner cap member 10, so that the contact regions 15a of the inner cap member 10 must be urged radially outwardly to achieve installation. As a result of this outward movement of the contact regions 15a, the base collar portion 14 deforms as indicated by the arrows in FIG. 4 so that the lobes become shallower, i.e. less curved, to the extent that the base collar portion 14 becomes substantially cylindrical, i.e. annular. This change in shape provides an interference fit between the fastener and the inner cap member 10 which can hold the cap in place during injection and curing of sealing material (see below). In some embodiments (not shown) the inner cap member 10 may incorporate mechanical locking features for providing a mechanical connection between the inner cap member 10 and the fastener 2, 3, 4. For example, the washer 4 may incorporate an overhang portion which interconnects with a snap-fit mechanism of the base cylindrical portion 15.

FIG. 4 illustrates the expected deformation of the base collar portion 14 when the diameter of the cylindrical collar part of the nut 3 is at its nominal dimension. If the diameter is smaller than the nominal dimension (e.g. because of manufacturing tolerances) then the base collar portion 14 may remain lobe shaped after installation, but with shallower lobes than before installation. On the other hand, if the diameter is larger than the nominal dimension then the base collar portion 14 may adopt an inverse lobed shape, in which the maximum extent of each lobe coincides with a contact region 15a (that is, the lobes are formed at the contact regions rather than between them). In each of these alternative cases the deformation provides an interference fit between the cap and the fastener.

The sealing volume 30 between the inner and outer cap members 10, 20 has two key regions: an annular sealing volume 34; and an interfay volume 36 which interconnects the inlet 28 and the annular sealing volume 34. The interfay volume 36 comprises a generally thin-walled dome shaped volume through which sealing material (not shown) can flow from the inlet 28 to the annular sealing volume 34 during assembly. The domed shape of the interfay volume 36 serves to aid this flow of sealing material since it provides little flow resistance compared with, for example, a volume incorporating sharp changes of direction or sharp corners. Once cured, the sealing material within the interfay volume 36 serves to bond the inner cap member 10 and outer cap member 20 together, and adds structural rigidity to the cap 100.

The annular sealing volume 34 is formed between the flared skirt 26 of the outer cap member 20 and the lower portion of the cylindrical portion 14 of the inner cap member 10. Thus, the annular sealing volume 34 has a generally flared shape such that its cross-sectional area increases with distance from the opening 28. The annular sealing volume 34 is open at its lower face such that the sealing material (not shown) can flow outwardly from the sealing volume 30 and into contact with the structural element 50. The flared shape of the annular sealing volume 34 provides a large adhesion area for the sealing material, which, once cured, acts to seal the cap 100 to the structural element 50. Moreover, this large adhesion area is achieved within a relatively small footprint on the structural element.

The lip (or rim) of the outer cap member 20 is axially offset from the base rim 18 of the inner cap member 10 in the embodiment of FIGS. 2 to 4. This arrangement ensures that the outer cap member 20 does not clash with features of the structural element, such as ramps or radii (fillets), in the event that the fastener is located very close to such features. Such a potential clash is not uncommon in aircraft structures, where it is possible for the outer edge of a fastener to be located only 1.6 mm from the edge of a fillet with a 5 mm radius. It also ensures that the seal is able to accommodate small surface feature deviations in the structural element, and is sufficiently thick to have a degree of flexibility once cured.

The shape of the sealing volume 30 between the inner and outer cap members 10, 20 is maintained (at least before and during injection of the sealing material 210) by a plurality of vanes (not shown) extending radially inwardly from the inner face of the outer cap member 20 and spaced evenly around the circumference thereof. The vanes abut the outer face of the inner cap member 10 to ensure the outer cap member 20 is correctly located relative to the inner cap member 10. The vanes may control the relative radial position of the outer cap member 20 by means of their dimensions in a radial direction. That is, uniformly distributed vanes of equal axial width will ensure that the outer cap member 20 is co-axial with the inner cap member 10. The vanes may also control the relative positions of the cap members in an axial direction.

During installation, the cap 100 is first placed in the position shown in FIG. 2, with the tail end (or alternatively the head end) of a fastener 3 enclosed within the air cavity 12. The nozzle (not shown) of a sealing material injector gun is then inserted into the inlet 28 to create a temporary seal therebetween. The pre-mixed sealing material (not shown) is then injected from the nozzle into the interfay volume 36, from where it flows into the annular sealing volume 34. The sealing material completely fills the annular sealing volume 34 until it flows out and into contact with the structure 50, at which point the flow of sealing material from the nozzle is stopped.

After injection of curable sealing material into the sealing volume 30 the nozzle is removed and the injected sealing material is left to cure. On curing, it provides a strong adhesive bond between the cap 100 and structure 50, and also between the inner and outer cap members 10, 20. When the sealing material is an epoxy based adhesive as discussed above, it may cure to handling strength (i.e. a degree suitable to provide sufficient strength to withstand knocks or similar from assembly workers) within an hour or so. This compares to handling strength cure times of 12 hours or more for polysulphide or manganese dioxide based sealants.

The cured injected sealing material also serves to fully seal the air cavity 12. Thus, trapped air within the air cavity 12 can provide a safe environment within which sparking and out-gassing events caused during a lightning strike can be contained. Ingress of fuel, water or other contaminants into the air cavity 12 is also prevented.

The sealing material injection method of the present invention avoids the accumulation of air pockets (i.e. entrapment of air) within the sealing volume 30, since a uniformly distributed coverage of sealing material is achieved. Such air pockets are particularly undesirable because they may cause the seal to be compromised and a consequent leakage of fuel through the fastener joint. In extreme cases such uncontrolled sparking or out-gassing events could even cause fuel ignition.

In a variation to the first embodiment, the sealing material inlet 28 may be omitted, and instead the sealing material may be applied into the central dome portion 22 of the outer cap member 20 and then the outer cap member 20 assembled with the inner cap member 10 so that the sealing material is forced to flow through the sealing volume 30 until it flows out of the annular sealing volume 34 and into contact with the structure 50. In an alternative variation, the sealing material inlet 28 may not be centrally located in the central dome portion 22, but may be located elsewhere on the outer cap member 20 such as in the skirt 26.

Figure 5:
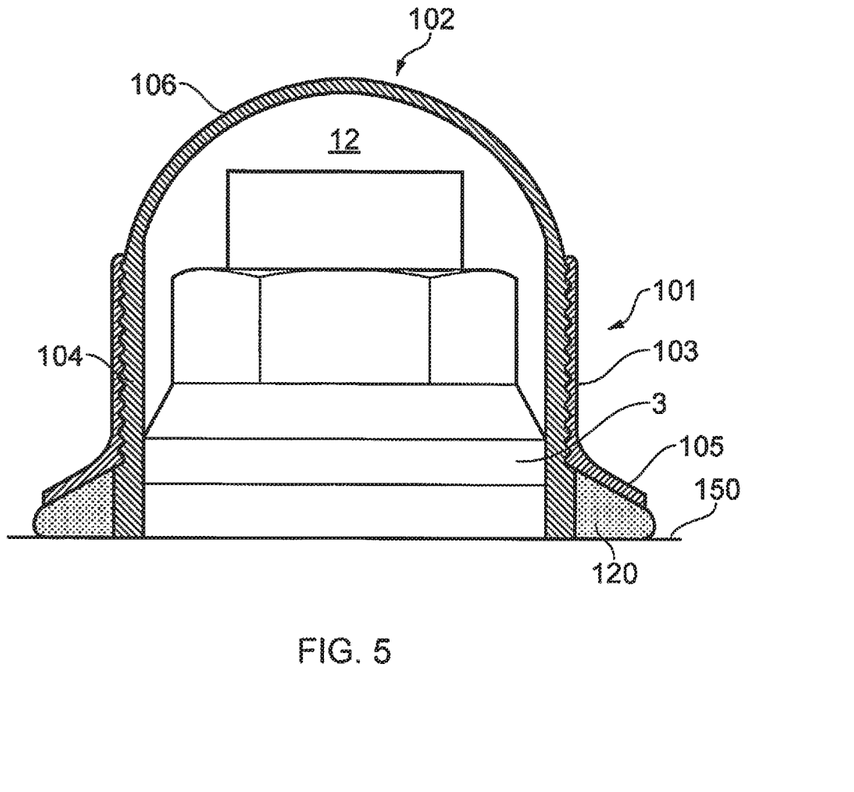
FIG. 5 shows a cross-sectional side view of a further embodiment of a cap according to the present invention.
Figure 6:
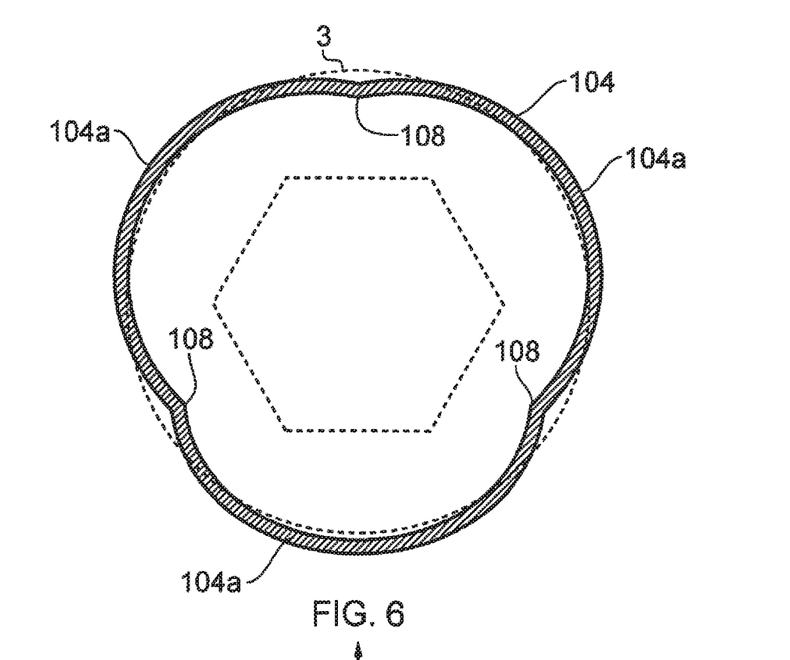
FIGS. 6 and 7 show transverse cross-sectional views of the cap of FIG. 5 before (FIG. 6) and after (FIG. 7) installation.
Figure 7:
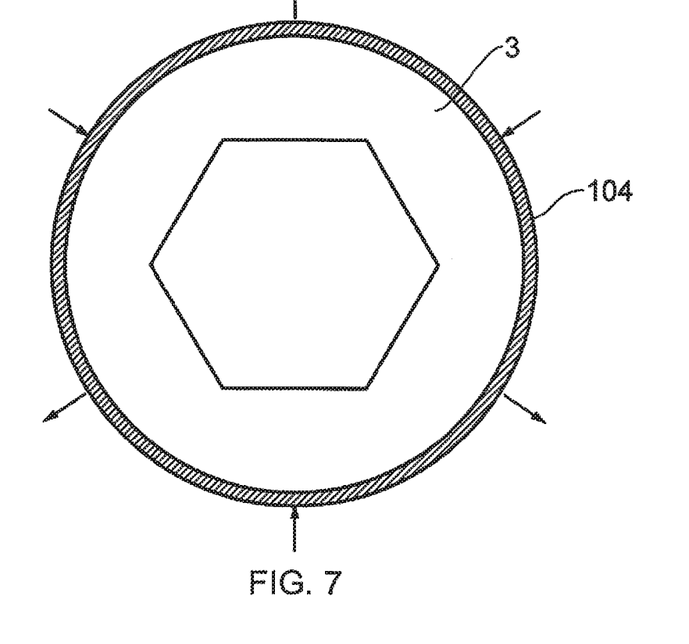

FIGS. 5 to 7 illustrate a second embodiment in which the cap 100 comprises a plunger 101 and a cap base 102 (also referred to as a cap body), instead of the inner 10 and outer 20 cap of the first embodiment. The second embodiment is similar in many respects to the first, third and fourth embodiments, and all relevant description of those embodiments is applicable also to the second embodiment. In particular, all description in relation to the form and function of the tri-lobed (or multi-lobed) shape of the collar portion is applicable to the second embodiment.

The plunger 101 and base 102 are each injection moulded from a polymer such as polyetherimide ULTEM™ 2400. The cap base 102 is a generally thin-walled vessel with a collar shaped base portion 104 integrated with a dome shaped part 106. The base 102 is arranged to be installed onto the end of a fastener (nut 3 in FIGS. 5 to 7) so that the collar shaped base portion 104 encircles the fastener end and the dome shaped part 106 encloses it.

The collar base portion 104 has a tri-lobed shape in cross-section, as shown in FIG. 6. The lobed shape has the same features and functions as the lobed shaped of the inner cap member 10 described above in relation to the first embodiment. In particular, the tri-lobed cross-sectional shape extends from the lower rim of the base 102 to a location substantially in line with (or in the vicinity of) the junction between the collar part 103 and the annular flange 105 of the plunger 101. The cross-sectional shape of the base 102 between this location and the dome portion 106 changes to provide a continuous blending from the tri-lobed shape to a substantially circular shape. Also, as shown in FIGS. 6 and 7, as the base 102 is installed onto the fastener end the collar part 104 changes shape to either become substantially cylindrical (in the event that the nut has a nominal, or close to nominal, diameter, as shown in FIG. 7), have shallower lobes (in the event that the nut 3 has a smaller than nominal diameter), or have an inverse lobed shape (in the event that the nut 3 has a larger than nominal diameter). A difference from the first embodiment is that the base 102 of the second embodiment does not have any inwardly projecting ridges 15, but instead the contact regions 108 at which the base 102 initially contacts the fastener end to begin the deformation process are simply discrete regions of the internal face of the collar portion 104 of the base 102. In variations of the second embodiment, the contact regions 108 of the collar portion 104 may include inwardly projecting ridges similar to those of the first embodiment.

The plunger 101 has a generally cylindrical collar part 103 integrated with a frustoconical skirt or annular flange 105 which extends radially outwardly from the base of the collar part 103. The annular volume between the annular flange 105 and the cap base 102 defines an annular sealing volume 34 within which sealing material 120 is located in order to seal the air cavity within the cap body 102.

The plunger 101 is arranged to be assembled with the base 102 so that it can slide axially relative to the base. FIG. 5 illustrates the final assembly positions of the base 102 and plunger 101, the plunger 101 having been moved downwards (i.e. the downwards direction of FIG. 5) towards the structure 50 in order to achieve the installation. The cap body 102 is first installed on the fastener end, and the plunger 101 then moved axially relative to the cap body 102 so that sealing material 120 (such as a polysulphide sealing material) within the annular sealing cavity 34 is brought into contact with the structure 50 to form a seal between the cap body 102 and the structure 50.

Figure 8:
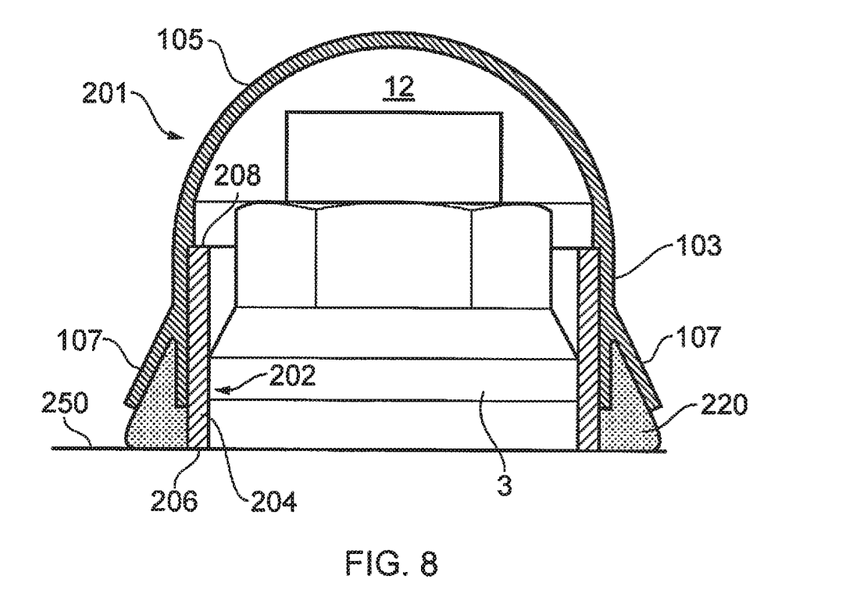
FIG. 8 shows a cross-sectional side view of an embodiment of a cap according to the present invention that is similar to the embodiment of FIG. 5.

An advantage of the plunger/sliding base arrangement of FIG. 5 is that the installation of the generally cylindrical collar part 103 of the plunger 101 on the base 102 may act to further deform the base 102 to further alter its cross-sectional shape. That is, the installation of the plunger 101 may cause the base 102 to become substantially circular in cross-section or alternatively to more closely approach a substantially circular cross-sectional shape. FIG. 8 illustrates a third embodiment, which is a variation of the second embodiment shown in FIGS. 5 to 7. The description above in relation to the second embodiment of features common to both embodiments apply equally to the third embodiment. Moreover, the third embodiment is similar in many respects to the first, second and fourth embodiments, and all relevant description of those embodiments is applicable also to the third embodiment. In particular, all description in relation to the form and function of the tri-lobed (or multi-lobed) shape of the collar portion is applicable to the third embodiment.

In the third embodiment the cap body 202 comprises a base collar portion 204, but no upper dome portion. Thus, the base collar portion 204 is open at both ends, having a first base rim 206 which surrounds a first base opening and a second base rim 208 which surrounds a second base opening. The outer cap member 201 comprises a cylindrical base collar portion 103, an upper dome portion 105, and an annular flange 107 which extends radially outwardly from the base collar portion 103 at a position offset from the base rim of the base collar portion 103.

The outer cap member 201 acts as a plunger in the same manner as the plunger 101 of the second embodiment. Thus, the base collar portion 103 of the outer cap member 201 is arranged to fit over the base collar portion 204 of the inner cap body 202 so that it can slide axially relative to the inner cap body 202.

The base collar portion 204 of the inner cap body 202 has the same tri-lobed shape as the base collar portion 104 of the inner cap member 102 of the second embodiment, as shown in FIG. 6. The tri-lobed base collar portion 204 is thus arranged to deform on assembly with a nut 3 (or other fastener end) to assume the generally cylindrical shape shown in FIG. 7. In variations of the third embodiment, the contact regions of the base collar portion 204 may include inwardly projecting ridges similar to those of the first embodiment.

After installation of the base collar portion 204 of the inner cap body 202 on the nut 3, a bead of sealing material 220 is applied to the annular sealing volume defined between the annular flange 107 and base collar portion 103 of the outer cap member 201. The outer cap member 201 is then fitted onto the inner cap body 202 and moved axially towards the structure 250 to the position shown in FIG. 8, in which the sealing material 220 forms a continuous seal between the cap body 202 and the structure 250.

Figure 9:
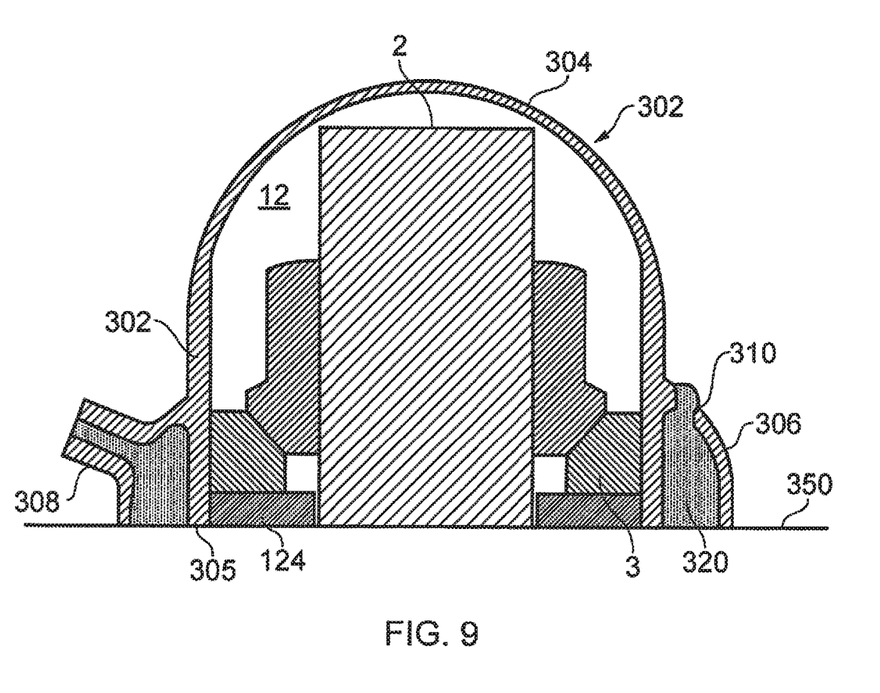
FIG. 9 shows a cross-sectional side view of another embodiment of a cap according to the invention.

FIG. 9 shows a fourth embodiment of the invention, in which there is only one cap member 302. The fourth embodiment is similar in many respects to the first, second and third embodiments, and all relevant description of those embodiments is applicable also to the fourth embodiment. In particular, all description in relation to the form and function of the tri-lobed (or multi-lobed) shape of the collar portion is applicable to the fourth embodiment.

The fourth embodiment is similar to the first, second and third embodiments in that the cap member 302 has a base collar portion 304 and upper dome portion 306, the collar portion 304 having a tri-lobed shape in cross-section. Thus, the collar portion 304 is shaped before and after installation on the nut 3 as shown in FIGS. 6 and 7, respectively. In preferred implementations of the fourth embodiment, the tri-lobed cross-sectional shape extends from the lower rim of the base collar portion 304 to a location substantially in line with (or in the vicinity of) the junction between the collar portion and the annular flange 306. The cross-sectional shape of the base collar portion 304 between this location and the upper dome portion 306 changes to provide a continuous blending from the tri-lobed shape to a substantially circular shape. In variations of the fourth embodiment, the contact regions of the base collar portion 204 may include inwardly projecting ridges similar to those of the first embodiment.

The cap member 302 has an annular flange 306 extending radially outwardly from an intersection with the collar portion 304 that is offset from the base rim 305 of the collar portion 304 that surrounds the opening into the cavity defined by the cap member 203. The annular flange 306 and collar portion 304 thus define between them an annular sealing volume which is filled with sealing material 320 in order to provide a continuous seal between the cap member 302 and the structure 350 to thereby seal the cavity. The cap member 302 includes a sealing material inlet 308 in the annular flange 306, which is in fluid communication with the annular sealing volume. The sealing material inlet 308 is designed to interface with the nozzle of a sealing material injection device (not shown) in order to inject the sealing material 320 via the sealing material inlet 308 into the annular sealing volume.

The cap member 302 also includes a sealing material outlet 310 in the annular flange 306 to provide an outlet for air within the annular sealing volume to escape as the volume is filled with sealing material 320. The outlet 310 is positioned opposite to the inlet 308 (i.e. on opposite sides of the longitudinal axis of the cap, and in the part of the flange 306 that is furthest from the inlet 308) so that sealing material 320 exiting the sealing volume via the outlet 310 can act as an indicator that the sealing volume is filled with sealing material. The outlet 310 in FIG. 9 comprises a closed hole within the annular flange 306, but it may alternatively comprise a recess in the base rim 305 of the flange.

In all of the embodiments of the invention, the cap includes a cap body which has a collar portion having three or more contact regions at which the collar portion is arranged to contact a fastener end on which the cap is to be installed, and a multi-lobed shape in cross-section such that a lobe extends between each neighbouring pair of contact regions.

In the first, second or third embodiments the cap assembly can be supplied as a kit of parts, with the inner cap member 10, 102, 202 supplied separately from the outer cap member 20, 101, 201. In all embodiments the sealing material 120, 220 may be supplied separately, e.g. in a sealant injection device, or pre-installed in the outer cap member or annular sealing volume of the cap, and e.g. frozen to preserve its shelf life. Similarly, the cap assembly according to any embodiment may be supplied as a kit of parts with the fastener to which it is to be installed.

In all embodiments of the invention where various features are described as being annular, these parts may have a circular cross-section. Note however that in the case of a non-circular (for instance square or hexagonal) cap assembly then these annular features will have a non-circular cross-sectional shape. Therefore the term "annular" is used herein to refer to a feature (for instance a shoulder, protrusion or recess) which runs round a circumference of the cap assembly regardless of the shape of that circumference.

Although the invention has been described above with reference to one or more preferred embodiments, it will be appreciated that various changes or modifications may be made without departing from the scope of the invention as defined in the appended claims.

The invention claimed is:

1. A cap for forming a sealed cavity around an end of a fastener, the cap comprising a cap body having a collar portion terminating at a rim which surrounds an opening for receiving the end of the fastener, the collar portion having three or more discrete contact regions distributed around an internal face thereof, each contact region being arranged to contact the end of the fastener when the collar portion is installed on the end of the fastener, wherein the collar portion has a lobed shape in cross-section such that a radially outwardly bulging lobe extends between each neighbouring pair of contact regions, wherein each of the contact regions comprises a ridge projecting inwardly from the internal face of the collar portion, and wherein each ridge has an elongate shape such that its longitudinal direction corresponds to the axial direction of the cap body.

2. A cap according to claim 1, including a plunger terminating at a plunger rim which surrounds a plunger opening, and an annular flange extending radially outwardly away from the plunger so as to define an annular sealing cavity, the plunger being fitted over the collar portion and being slidably movable in an axial direction relative to the collar portion, and the plunger or the collar portion comprising an end wall opposite the plunger opening or the collar portion opening, respectively, to form an enclosure.

3. A cap for forming a sealed cavity around an end of a fastener, the cap comprising a cap body having a collar portion terminating at a rim which surrounds an opening for receiving the end of the fastener, the collar portion having three or more discrete contact regions distributed around an internal face thereof, each contact region being arranged to contact the end of the fastener when the collar portion is installed on the end of the fastener, wherein the collar portion has a lobed shape in cross-section such that a radially outwardly bulging lobe extends between each neighbouring pair of contact regions, the cap having an annular flange which extends radially outwardly from the collar portion at an intersection which is set back from the rim so as to define an annular sealing cavity between the flange and the collar portion.

4. A cap according to claim 3, wherein each of the contact regions comprises a ridge projecting inwardly from the internal face of the collar portion.

5. A cap according to claim 3, wherein the cap body has an end wall opposite the collar portion opening to form an enclosure.

6. A cap according to claim 3, further including a sealing material inlet in fluid communication with the annular sealing cavity, the sealing material inlet being arranged to interconnect with a sealing material injection device to provide a flow of curable sealing material from the sealing material inlet into the annular sealing cavity.

7. A cap according to claim 3, wherein the collar portion has three, four, five or six of said discrete contact regions distributed around an internal face thereof.

8. A cap according to claim 3, wherein the collar portion has no more than six of said discrete contact regions distributed around an internal face thereof.

9. A cap for forming a sealed cavity around an end of a fastener, the cap comprising a cap body having a collar portion terminating at a rim which surrounds an opening for receiving the end of the fastener, the collar portion having three or more discrete contact regions distributed around an internal face thereof, each contact region being arranged to contact the end of the fastener when the collar portion is installed on the end of the fastener, wherein the collar portion has a lobed shape in cross-section such that a radially outwardly bulging lobe extends between each neighbouring pair of contact regions, the cap having an outer cap member arranged to be installed over the cap body so as to enclose the cap body, the outer cap member having an annular collar portion and an annular flange which extends radially outwardly away from the annular collar portion, the annular flange and annular collar portion between them defining an annular sealing cavity for receiving sealing material.

10. A cap according to claim 9, wherein the annular base of the outer cap member terminates at a rim, and the annular flange extends from the outer cap member at an intersection which is set back from the rim.

11. A joint comprising: a structure; a fastener passing through the structure so that an end thereof protrudes from the structure, wherein the fastener comprises a nut; and a cap providing a sealed cavity around the end of the fastener, the cap comprising a cap body having a collar portion terminating at a rim which surrounds an opening for receiving the end of the fastener, the collar portion having three or more discrete contact regions distributed around an internal face thereof, each contact region contacting the end of the fastener, wherein the collar portion has a lobed shape in cross-section such that a radially outwardly bulging lobe extends between each neighbouring pair of contact regions, and wherein a sealant material provides a seal between the collar portion of the cap and the structure.

12. An aircraft assembly comprising a joint according to claim 11.

13. A joint according to claim 11, wherein the cap provides the sealed cavity around the nut.

* * * * *